Jan. 20, 1925.                                          1,523,389
O. F. BEYTHAN
GRAIN SORTING AND CLEANING MACHINE
Filed Jan. 29, 1923
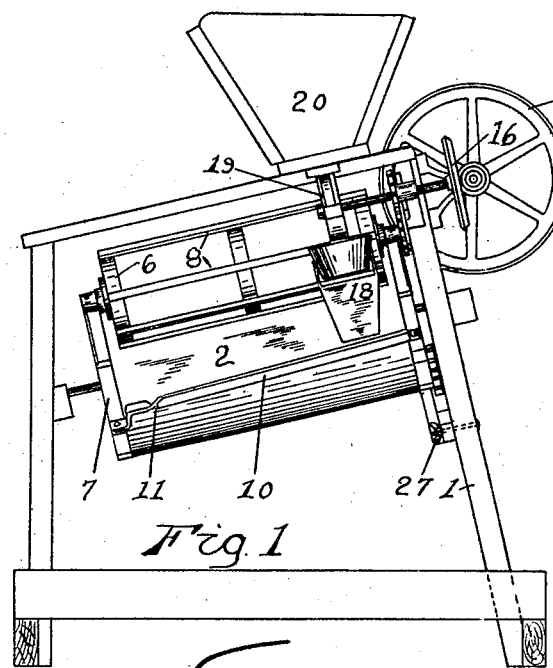
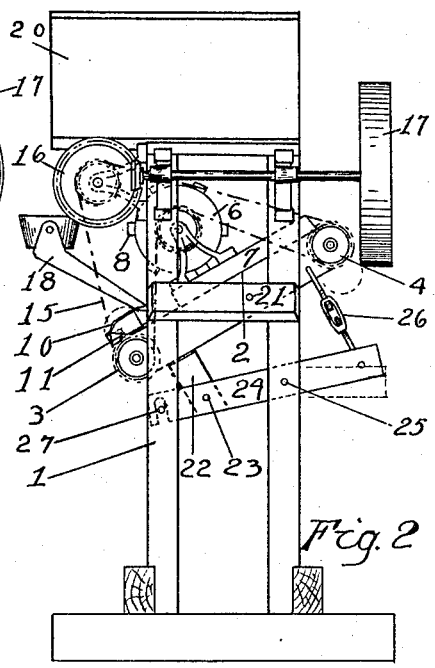
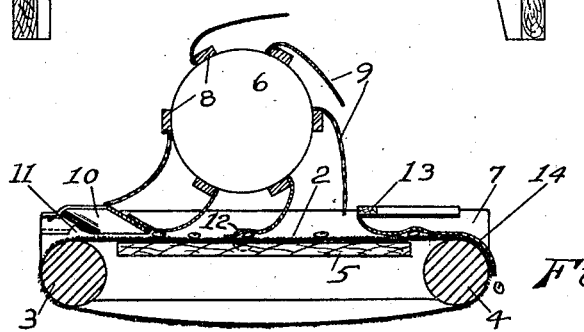
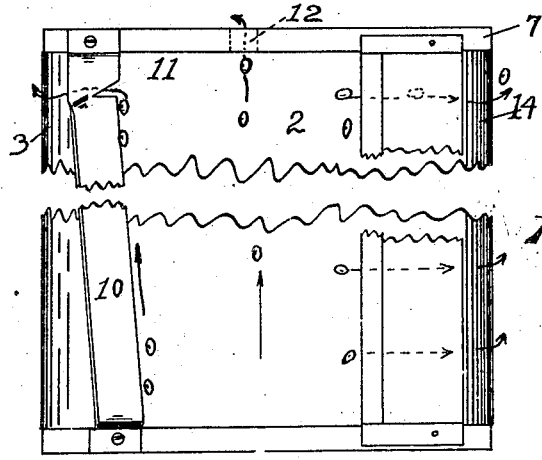
INVENTOR
Otto F. Beythan
BY
Geo. B. Willey
ATTORNEY Patented Jan. 20, 1925.

1,523,389

UNITED STATES PATENT OFFICE.

OTTO F. BEYTHAN, OF FREELAND, MICHIGAN.

GRAIN SORTING AND CLEANING MACHINE.

Application filed January 29, 1923. Serial No. 615,628.

*To all whom it may concern:*

Be it known that I, OTTO F. BEYTHAN, a citizen of the United States, residing at Freeland, in the county of Saginaw and State of Michigan, have invented certain new and useful Improvements in Grain Sorting and Cleaning Machines; and I do hereby declare the following to be a full, clear, and exact description of the invention, such as will enable others skilled in the art to which it appertains to make and use the same.

This invention relates to bean cleaning and sorting machines and pertains more particularly to that class of machines employing a diagonally inclined traveling apron upon which the beans to be sorted are delivered, the cleaning action depending upon the relative tendency of smooth beans to roll down the traveling surface and the tendency of rough or split beans to remain upon the surface and be carried upwardly along with it.

To a machine of the above-mentioned class my improvement adds a novel means of gently wiping over and slightly rolling or moving the beans on the belt while they travel upward with the belt, thereby decreasing the chance of partially defective beans remaining on the belt and consequently being carried over into the receptacle for split and discarded beans.

My improvement, by mildly agitating and rolling the beans while they are on the traveling surface insures that the more perfect beans will be quickly delivered from the belt while less perfect beans will be discharged from the belt at an intermediate point so as not to be carried into the receptacle for the poorest grade of beans.

My device, therefore, sorts the raw material into three distinct grades.

A further object of my invention is to provide an efficient bean cleaner of such construction that it can be sold at a relatively low price and consequently can be used to advantage by an individual grower, enabling him to secure current market prices for the several grades into which this machine sorts his harvested material.

With the foregoing and certain other objects in view which will appear later in the specification my improvement consists in the devices described and claimed and the equivalents thereof.

In the drawings, Fig. 1 is a side view of a bean cleaning machine embodying my invention.

Fig. 2 is a front view of the same.

Fig. 3 is an enlarged part sectional transverse view of the belt, rollers and apron drum illustrated in horizontal position.

Fig. 4 is a top plan view of the belt, cross bar and guide plate shown in Fig. 3.

As is clearly shown in the drawings, the device consists in a suitable frame 1, upon which is mounted a conveying belt 2 carried by rollers 3 and 4. The top surface or run of the belt is supported intermediate the rollers by a stationary table 5, illustrated in Fig. 3.

The traveling belt is diagonally inclined, its run having an upward inclination, as shown in Fig. 2, and also a lateral inclination, as shown in Fig. 1, where one edge of the belt is higher than the other.

Located above the run of the belt is a revolvable drum 6, the axis of which is preferably parallel with the axes of the rollers 3 and 4. Both the drum and the rollers 3 and 4 may be mounted in suitable bearings on an auxiliary tiltable frame which is supported by the main frame 1.

The drum may carry longitudinal slats 8 or their equivalent, and to each slat is fastened a flexible apron of fabric, as for example, woolen cloth or felt. The aprons 9 are substantially equal in length to the width of the belt and they are so disposed with relation to the run of belt 2, as illustrated in Fig. 3 that the free edges and lower parts of the aprons 9 during the revolution of the drum successively wipe or drag over a part of the working surface of the belt 2 while the belt is traveling in the same direction as the aprons 9, but at slower speed.

A guide plate 10 of sheet metal is angularly disposed above the upper surface of the run of the belt, an edge of the guide plate close to the belt, as shown in Fig. 1. A notch 11 is formed in the edge of the guide plate 10 near its lower end for a purpose to be explained.

An opening 12 also is provided in the side of the auxiliary tiltable frame 7, as shown in Figs. 3 and 4.

Extending from side to side of the tiltable frame 7 is a cross bar 13 located as shown in Fig. 3 and having one edge of a flexible apron 14 secured thereto.

The traveling belt, rollers 3 and 4 and the drum 6 may be actuated by any suitable mechanism, but I prefer that shown in Figs. 1 and 2, where 15 is a sprocket chain mounted on a suitable sprocket wheel secured to roller 3. The chain also passes over a sprocket wheel on the shaft of a bevel driving gear 16 which receives its motion from a bevel pinion carried on the shaft of the driving pulley 17.

The chain passes over a sprocket on roller 4 and a sprocket on drum 6, so that power applied to pulley 17 will revolve the shaft of bevel gear 16 and also drive the drum 6 and rollers 3 and 4. The drum being of larger diameter than the rollers, its lower periphery will travel faster than the belt, and in the same direction.

In operation, beans are delivered to belt 2 near the uper edge of the lower part of the run, from a feed spout 18 located as shown in Figs. 1 and 2. Above this spout is located any suitable mechanical feed device, as 19, which may be actuated by the shaft of bevel gear 16. The feed device takes its supply from the main hopper 20.

The operation of the cleaning mechanism is as follows:

Beans delivered through spout 18 fall upon the run of the belt near its lower end, and since the belt is also tilted laterally, as shown in Fig. 1, the beans are fed to a point near the high edge of the belt. The belt, which is preferably of plush or some similar substance providing a fibrous or fuzzy surface, travels continuously upward from roller 3 to roller 4. Smooth perfect beans are not seized by the surface of the belt, but by reason of the motion of the belt, such beans roll along the edge of guide plate 10, toward the left in Fig. 1, and escape through the notch 11. Partly dirty or gritty beans, or those which are partly defective as to surface will be lightly seized and carried upward by the belt and meanwhile will be gently wiped by the free edges of the flexible aprons 9, the aprons by the weight of their free edges imparting sufficient agitation to the beans so that their tendency to roll down toward the lower edge of the belt is given opportunity to assist itself.

Those beans which are of a certain degree of roughness roll downward toward the left in Fig. 1 and finally come into contact with the auxiliary tiltable frame 7 as against a fence or guide and pass out through the opening 12, as shown in Figs. 3 and 4.

The split beans or very uneven beans do not roll so readily on belt 2, nor are they distributed by the repeated wipings of successive aprons 9 and are consequently carried further upward and finally pass under the apron 14 which lies loosely upon the belt 2. When the beans have once entered between the apron 14 and belt 2 they can not readily be dislodged or jarred back onto the working surface of the belt, as might be the case if apron 14 were not provided.

From the foregoing it will be seen that the diagonally inclined upward traveling run or working surface of the belt is continually tending to carry upward all the beans that fall upon it and that the perfect beans quickly drop back against the edge of guide plate 10 and escape through notch 11, while the less perfect ones are carried farther upward and after having been contacted by successive flexible aprons 9 escape at one edge of belt 2 through the opening 12. Meanwhile the split and worthless beans and pieces of dirt pass along with the belt, enter beneath flexible apron 14 and thence are discharged. My device, therefore, sorts the raw material into three distinct grades.

The efficiency of sorting or cleaning will depend somewhat upon the angle of tilt of the working surface or run of the belt, and I consequently mount the belt so that it is adjustable as to its inclination.

One preferred means of effecting the angular adjustment of the belt is shown in the drawings, where 21 is a pivot carried by frame 1. Tiltable frame 7 is mounted on this pivot. The lower end of the tiltable frame may be supported in adjusted positions by a movable block 22 pivoted as at 23 to a bar 24, which in turn is pivoted at 25 to a leg of frame 1. One end of bar 24 is connected by means of a turnbuckle 26 or its equivalent with the auxiliary frame 7.

The bar 24 may be clamped in place at its other end by a screw and wing nut 27. The angle of inclination of bar 24 may be varied as shown by the dotted lines in Fig. 2, and the bar 24 together with frame 7 and belt 2 may be held in any desired tilted position.

By the means above described I have produced a simple and relatively inexpensive device capable of sorting beans rapidly and economically into three grades. The machine is so designed that it can be constructed at small cost and thereby made available for the bean grower, thus avoiding the necessity of hauling the beans to a central sorting station equipped with expensive machinery.

Having thus described my invention, what I claim and desire to secure by Letters Patent is:

In a bean sorting machine, the combination of a diagonally tilted traveling belt, a guide plate near the lower end of the run of said belt, a guide member adjacent the lower edge of said belt and formed with a discharge opening, a plurality of wiping aprons above the run of said belt and actuating means for said aprons adapted to drag the free edges thereof successively over portions of the working surface of said belt.

In testimony whereof, I affix my signature.

OTTO F. BEYTHAN.